US012437111B1

(12) United States Patent
Rodgers et al.

(10) Patent No.: US 12,437,111 B1
(45) Date of Patent: *Oct. 7, 2025

(54) TOKEN BASED COMMUNICATIONS FOR MACHINE LEARNING SYSTEMS (71) Applicant: United Services Automobile Association (USAA), San Antonio, TX (US)

(72) Inventors: Fredrick William Rodgers, Northlake, TX (US); Michael P. Gout, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/504,466

(22) Filed: Nov. 8, 2023

Related U.S. Application Data (63) Continuation of application No. 16/129,310, filed on Sep. 12, 2018, now Pat. No. 11,847,246.

(Continued)

(51) Int. Cl.
*G06Q 30/00* (2023.01)
*G06F 18/214* (2023.01)
(Continued)

(52) U.S. Cl.
CPC ........ *G06F 21/6254* (2013.01); *G06F 18/214* (2023.01); *G06N 5/04* (2013.01); *G06N 20/00* (2019.01); *H04L 9/3213* (2013.01)

(58) Field of Classification Search
None
See application file for complete search history.

(56) References Cited

U.S. PATENT DOCUMENTS 3,240,017 A * 3/1966 Boissevain ............... F01C 7/00
  23/301
5,745,755 A * 4/1998 Covey ..................... G06F 16/00
  707/999.203

(Continued)

FOREIGN PATENT DOCUMENTS

EP 3080741 A2 10/2016
EP 3080741 B1 3/2018

(Continued)

OTHER PUBLICATIONS

• Ali Gholami. "Security and Privacy of Sensitive Data in Cloud Computing," (2016). Retrieved online Mar. 24, 2022. https://www.diva-portal.org/smash/get/diva2:925669/FULLTEXT01.pdf (Year: 2016).*

(Continued)

*Primary Examiner* — James A Reagan
(74) *Attorney, Agent, or Firm* — Fish & Richardson P.C.

(57) ABSTRACT

Techniques are described for communicating between two organizations without exchanging sensitive private information. One of the methods includes generating a token representative of private data. The method includes identifying at least one entity associated with the private data. The method includes associating the token with at least one entity. The method also includes providing information identifying at least one entity and the token to a machine learning system.

18 Claims, 9 Drawing Sheets

Related U.S. Application Data (60) Provisional application No. 62/558,471, filed on Sep. 14, 2017.

(51) Int. Cl.
    *G06F 21/62*    (2013.01)
    *G06N 5/04*    (2023.01)
    *G06N 20/00*    (2019.01)
    *H04L 9/32*    (2006.01)

(56) References Cited

U.S. PATENT DOCUMENTS

| | | | | |
|---|---|---|---|---|
| 6,484,174 B1* | 11/2002 | Wall | | H04L 63/08 709/227 |
| 6,941,287 B1* | 9/2005 | Vaidyanathan | | G06F 18/10 706/14 |
| 7,600,253 B1* | 10/2009 | Wang | | G06F 16/288 713/172 |
| 8,892,495 B2* | 11/2014 | Hoffberg | | F24F 11/62 706/48 |
| 8,925,053 B1* | 12/2014 | Mehta | | G06F 21/31 726/4 |
| 9,578,048 B1* | 2/2017 | Hunt | | H04L 63/1416 |
| 9,692,789 B2* | 6/2017 | Kirti | | H04L 63/1425 |
| 10,104,237 B1* | 10/2018 | Amin | | H04L 65/102 |
| 10,129,211 B2* | 11/2018 | Heath | | G06Q 30/02 |
| 10,276,054 B2* | 4/2019 | Eger | | G06Q 30/02 |
| 10,367,946 B2* | 7/2019 | Amin | | H04L 65/1069 |
| 10,574,647 B2* | 2/2020 | Ogawa | | H04L 63/083 |
| 10,637,994 B2* | 4/2020 | Amin | | H04L 63/1425 |
| 10,768,893 B2* | 9/2020 | Misra | | G06F 11/3676 |
| 10,904,261 B2* | 1/2021 | Atanda | | H04L 63/08 |
| 10,958,679 B2* | 3/2021 | Kirti | | H04L 63/1416 |
| 11,170,294 B2* | 11/2021 | Bruestle | | G06F 5/01 |
| 11,258,827 B2* | 2/2022 | Biswas | | H04L 63/20 |
| 11,847,246 B1 | 12/2023 | Rodgers et al. | | |
| 2003/0115188 A1 | 6/2003 | Srinivasa | | G06F 16/335 |
| 2003/0115189 A1 | 6/2003 | Srinivasa | | G06F 16/335 |
| 2007/0239752 A1* | 10/2007 | Beitman | | G06F 7/02 |
| 2011/0173684 A1* | 7/2011 | Hurry | | G06F 21/34 726/6 |
| 2011/0209159 A1* | 8/2011 | Baratz | | G06F 16/24575 707/E17.112 |
| 2012/0210408 A1* | 8/2012 | Lu | | H04L 9/3226 726/6 |
| 2013/0080641 A1* | 3/2013 | Lui | | H04L 41/0886 709/226 |
| 2013/0132230 A1* | 5/2013 | Gibson | | H04L 67/535 709/204 |
| 2013/0147598 A1* | 6/2013 | Hoffberg | | F24F 11/30 340/5.1 |
| 2013/0268357 A1* | 10/2013 | Heath | | G06Q 10/10 726/26 |
| 2013/0325704 A1* | 12/2013 | Gorman | | G06Q 10/06 705/325 |
| 2014/0019757 A1* | 1/2014 | Mehtala | | H04L 9/3234 713/168 |
| 2014/0040463 A1* | 2/2014 | Skvortsov | | G06F 16/95 709/224 |
| 2014/0189808 A1* | 7/2014 | Mahaffey | | H04L 63/083 726/4 |
| 2015/0033306 A1* | 1/2015 | Dickenson | | G06F 21/31 726/7 |
| 2015/0170050 A1* | 6/2015 | Price | | G06F 16/2477 706/13 |
| 2015/0172321 A1* | 6/2015 | Kirti | | H04L 63/1425 726/1 |
| 2015/0204559 A1* | 7/2015 | Hoffberg | | G06N 20/00 700/278 |
| 2015/0317801 A1* | 11/2015 | Bentley | | G08B 21/043 382/107 |
| 2015/0319185 A1* | 11/2015 | Kirti | | H04L 67/306 726/23 |
| 2016/0078245 A1* | 3/2016 | Amarendran | | G06N 20/00 713/193 |
| 2016/0117316 A1* | 4/2016 | Le | | G10L 15/16 704/9 |
| 2017/0046411 A1* | 2/2017 | D'Souza | | G06F 40/40 |
| 2017/0097959 A1* | 4/2017 | Nachiappan | | G06F 16/2455 |
| 2017/0200094 A1* | 7/2017 | Bruestle | | G06F 7/023 |
| 2017/0244749 A1* | 8/2017 | Shulman | | H04L 63/1441 |
| 2017/0257359 A1* | 9/2017 | Ogawa | | G06F 16/951 |
| 2017/0262697 A1* | 9/2017 | Kaps | | G11B 27/022 |
| 2017/0286914 A1* | 10/2017 | Fang | | G06N 20/00 |
| 2017/0295199 A1* | 10/2017 | Kirti | | H04L 63/1416 |
| 2018/0025140 A1* | 1/2018 | Edelman | | G06Q 20/4016 726/7 |
| 2018/0165781 A1* | 6/2018 | Rodriguez | | G06Q 20/3672 |
| 2018/0176017 A1* | 6/2018 | Rodriguez | | H04L 63/20 |
| 2018/0181873 A1* | 6/2018 | Chen | | H04L 51/214 |
| 2019/0089840 A1* | 3/2019 | Amin | | H04L 65/1096 |
| 2019/0155572 A1* | 5/2019 | Misra | | G06F 11/263 |
| 2019/0253431 A1* | 8/2019 | Atanda | | G06F 21/62 |
| 2020/0084318 A1* | 3/2020 | Amin | | H04M 7/0078 |
| 2021/0168167 A1* | 6/2021 | Kirti | | H04L 63/1425 |

FOREIGN PATENT DOCUMENTS

| | | | | |
|---|---|---|---|---|
| WO | WO 1999/64948 | | 12/1999 | |
| WO | WO-9964948 A1 * | | 12/1999 | G06F 21/335 |
| WO | WO 2007/012814 | | 2/2007 | |
| WO | WO-2007012814 A2 * | | 2/2007 | G06F 21/35 |
| WO | WO 2015088702 | | 6/2015 | |
| WO | WO 2017/120517 | | 7/2017 | |
| WO | WO-2017120517 A1 * | | 7/2017 | G06F 5/01 |

OTHER PUBLICATIONS

• Tom M. Mitchell. "Machine Learning." (Mar. 1, 1997). Retrieved online Jan. 13, 2023. https://www.cin.ufpe.br/~cavmj/Machine%20-%20Learning%20-%20Tom%20Mitchell.pdf (Year: 1997).*

• Piotr Mirowski. "Time Series Modeling with Hidden Variables and Gradient-Based Algorithms." (Jan. 2011). Retrieved online May 1, 2023. https://cs.nyu.edu/media/publications/mirowski_piotr.pdf (Year: 2011).*

Gholami, "Security and Privacy of Sensitive Data in Cloud Computing," Diva-portal.org, 2016, retrieved on Mar. 24, 2022, retrieved from URL <https://www.diva-portal.org/snnash/get/diva2:925669/FULLTEXT01.pdf>.

Gholami, "Security and Privacy of Sensitive Data in Cloud Computing," Doctoral Thesis, Department of Computational Science and Technology KTH School of Computer Science and Communication, 2016, 280 pages.

Mirowski, "Time Series Modeling with Hidden Variables and Gradient-Based Algorithms," A Dissertation submitted in Partial Fulfillment of the Requirements for the Degree of Doctor of Philosophy, Department of Computer Science, Courant Institute of Mathematical Sciences, New York University, Jan. 2011, 215 pages.

Mirowski. Time Series Modeling with Hidden Variables and Gradient-Based Algorithms. (Jan. 2011). Retrieved online May 1, 2023. https://cs.nyu.edu/media/publications/mirowski_piotr.pdf (Year: 2011).

Mitchell, "Machine Learning," McGraw-Hill Science.Engineering/Math, Mar. 1, 1997, 421 pages.

Mitchell. "Machine Learning." (Mar. 1, 1997). Retrieved online Jan. 13, 2023. https://www.cin.ufpe.br/-cavmj/Machine%20-%20Learning%20-%20Tom%20Mitchell.pdf (Year: 1997).

* cited by examiner

TOKEN BASED COMMUNICATIONS FOR MACHINE LEARNING SYSTEMS

CROSS-REFERENCE TO RELATED APPLICATIONS

This application is a continuation application of, and claims priority to, U.S. patent application Ser. No. 16/129,310, entitled "TOKEN BASED COMMUNICATIONS FOR MACHINE LEARNING SYSTEMS," filed on Sep. 12, 2018, which application claims priority under 35 U.S.C. § 119 to U.S. Application Ser. No. 62/558,471, filed on Sep. 14, 2017, and entitled "TOKEN BASED COMMUNICATIONS FOR MACHINE LEARNING SYSTEMS," the entire contents of each are incorporated by reference herein.

BACKGROUND

Personally identifiable information, or sensitive personal information is information that can be used on its own or with other information to identify, contact, or locate a single person, or to identify an individual in context. In general, communicating personally identifiable information between entities (such as corporations) is subject to regulatory restrictions. Further, information that an organization knows about an individual (such as a customer), and internal business practices are generally considered proprietary information with business value.

SUMMARY

In general, an innovative aspect of the subject matter described in this specification can be embodied in methods that include the act of generating a token representative of private data. The method includes the act of identifying at least one entity associated with the private data. The method includes the act of associating the token with at least one entity. The method includes the act of communicating the token and associated entity as label data for training of a machine learning system. The method includes the act of associating the token and associated entity with additional corresponding data as feature data for training of a machine learning system. The method includes the act of training a machine learning system using the combined label and feature data. The method also includes the act of using the trained machine learning system to make one or more inferences on entities for the token.

In general, another innovative aspect of the subject matter described in this specification can be embodied in methods that include act of generating a token representative of private data. The methods include the act of identifying at least one entity associated with the private data. The methods include the act of associating the token with at least one entity. The methods also include the act of providing information identifying at least one entity and the token to a machine learning system. The methods also include the act of receiving information from a trained machine learning system on entities.

In general, another innovative aspect of the subject matter described in this specification can be embodied in methods that include act of receiving a list of entities, each entity associated with at least one token. The methods include the act of obtaining additional information from the machine learning system associated with the corresponding entity. The methods include the act of generating training data including training examples, each training example including the additional information associated with an entity of at least some entities and a token from the at least one token associated with the entity. The methods also include the act of training a machine learning system using the training data.

In general, another innovative aspect of the subject matter described in this specification can be embodied in methods that include the act of receiving from a trained learning machine information identifying one or more entities likely to be associated with a token, where the trained learning machine is trained to make inferences about entities based on a token that is indicative of private data and does not contain information sufficient for the operator of the trained learning machine to identify the private data.

Implementations can optionally include one or more of the following features, alone or in combination. At least one entity may be identified by an identifier shared with the machine learning system. The token may be representative of an event that has occurred. The token may be representative of membership in a group. The token may not contain information sufficient to identify the private data. The methods may include the acts of providing one or more individual identifiers to a machine learning system and receiving additional information from the machine learning system identifying at least some of the one or more entities likely to be associated with the token.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations of the present disclosure provide one or more of the following advantages. Organizations can leverage and share information about entities without exposing protected information about entities, or proprietary business practices of the organization. A knowledge provider may leverage their knowledge for third parties without knowing what the third parties are going to use it for. Furthermore, organizations can receive this knowledge without knowing the details of the data used to provide it. Two or more organizations can exchange customer behavioral knowledge derived from machine learning without violating individual privacy, exchanging personal information (PII) or exposing intellectual property (trade secrets, patents, copyrights, etc.)

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
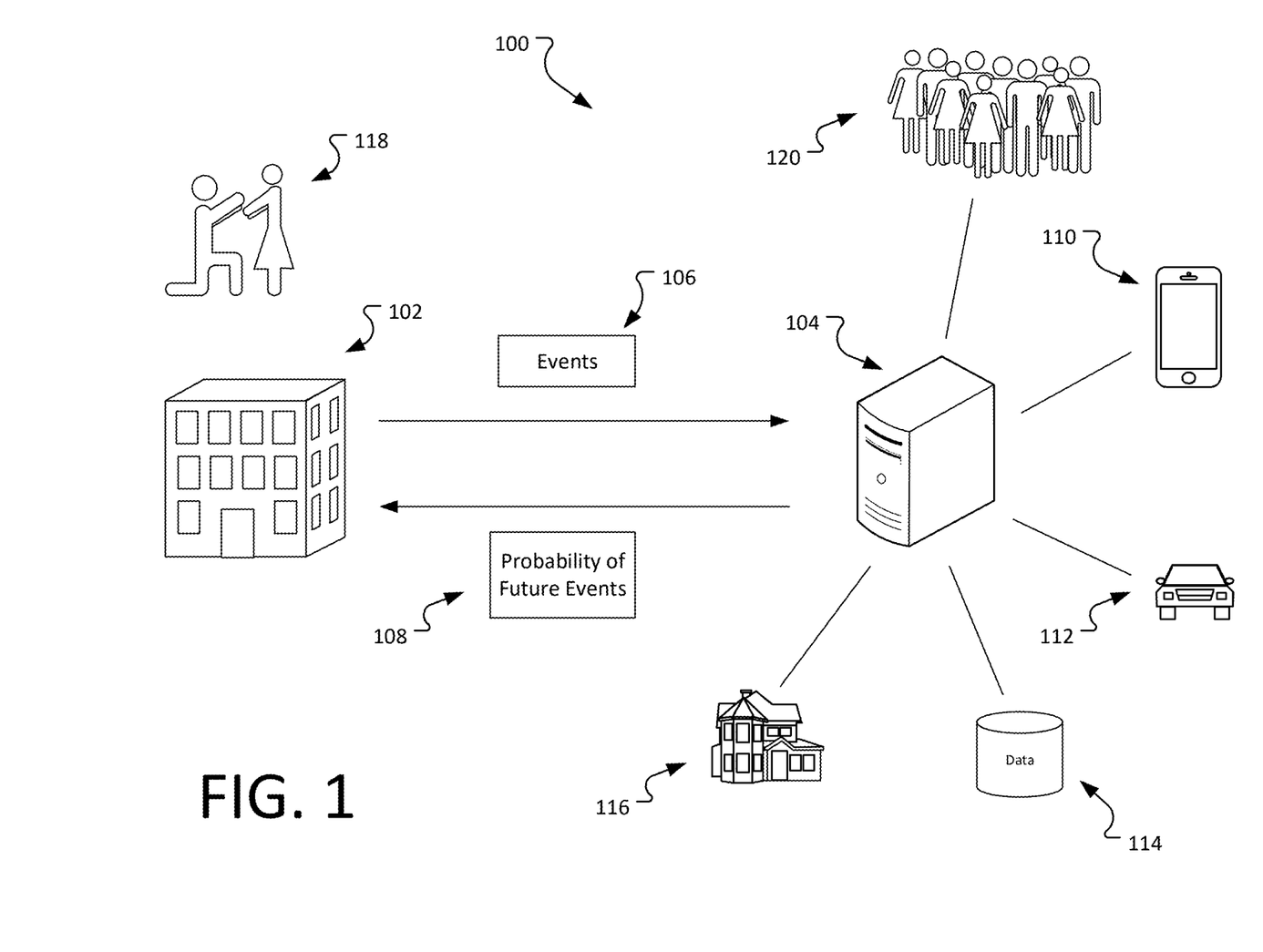
FIG. 1. illustrates an example of an environment for sharing information using tokens.

FIG. 1 illustrates an example of an environment for sharing information using tokens. In the environment 100, an organization 102 may want to determine information about a group of people. These people may be, for example, its customers, employees, potential customers, people in a particular geographic area, etc. In this example, the organization 102 wants to know which customers are likely to get married 118 within a particular time (for example, within the next six months).

In this example, the organization creates a token 106 that represents the marriage event label for training or inference to a machine learning system 104. As described further below, the token may not convey any information about the nature of the event on its own. For example, the token may be a number, string, hash, or any other value or combination of values. The token provides a mechanism whereby the organization 102 can communicate event or attribute labels to the machine learning system 104 without revealing to the learning machine system 104 the meaning of the event or attribute labels.

The machine learning system 104 is trained on the historical token data 106 provided by 102, in combination with a variety of additional data that the machine learning system has access to. For example, this data may include, but is not limited to, information about communications or relationships between different people in a group 120 (for example, as may be provided by a social networking site), information from portable computing devices 110 (for example, geolocation data, app data, communication data, web browsing data, etc.), information from user's automobile 112, and information from a user's smart home 116. The machine learning system may also include information 114 provided by the organization 102. For example, the machine learning system may have a list of entities that have experienced the requested event and a date at which the event was experienced. As used herein, an entity may refer to anything for which an organization may wish to determine events and/or grouping for. An entity can include, for example, an individual, a group of individuals (such as a family, a club, or social group), an organization, a place, a thing, an animal, etc.

In some implementations, the organization 102 and the machine learning system 104 can identify select entities using a common identifier. For example, the organization and the machine learning system may have a common identifier for some or all of the customers of the organization.

The machine learning system identifies the entities who match the criteria specified by the organization. For example, entities identified as having a sufficiently high probability of the event, identified by the token, occurring within a predetermined time period. In one example, the machine learning system can identify entities who have greater than a 75% chance of the event occurring within the next three months.

It should be understood that while the organization 102 is illustrated as a building, the organization may contain one or more computer systems and one or more associated individuals that may, alone or in conjunction, perform the actions attributed to the organization. For example, individuals within the organization may determine the criteria including the events, probabilities, and time frames, a computer system may tokenize the event, send the request to the machine learning system, receive a response, detokenize the response and generate a report or perform other action using the data.

Figure 2:
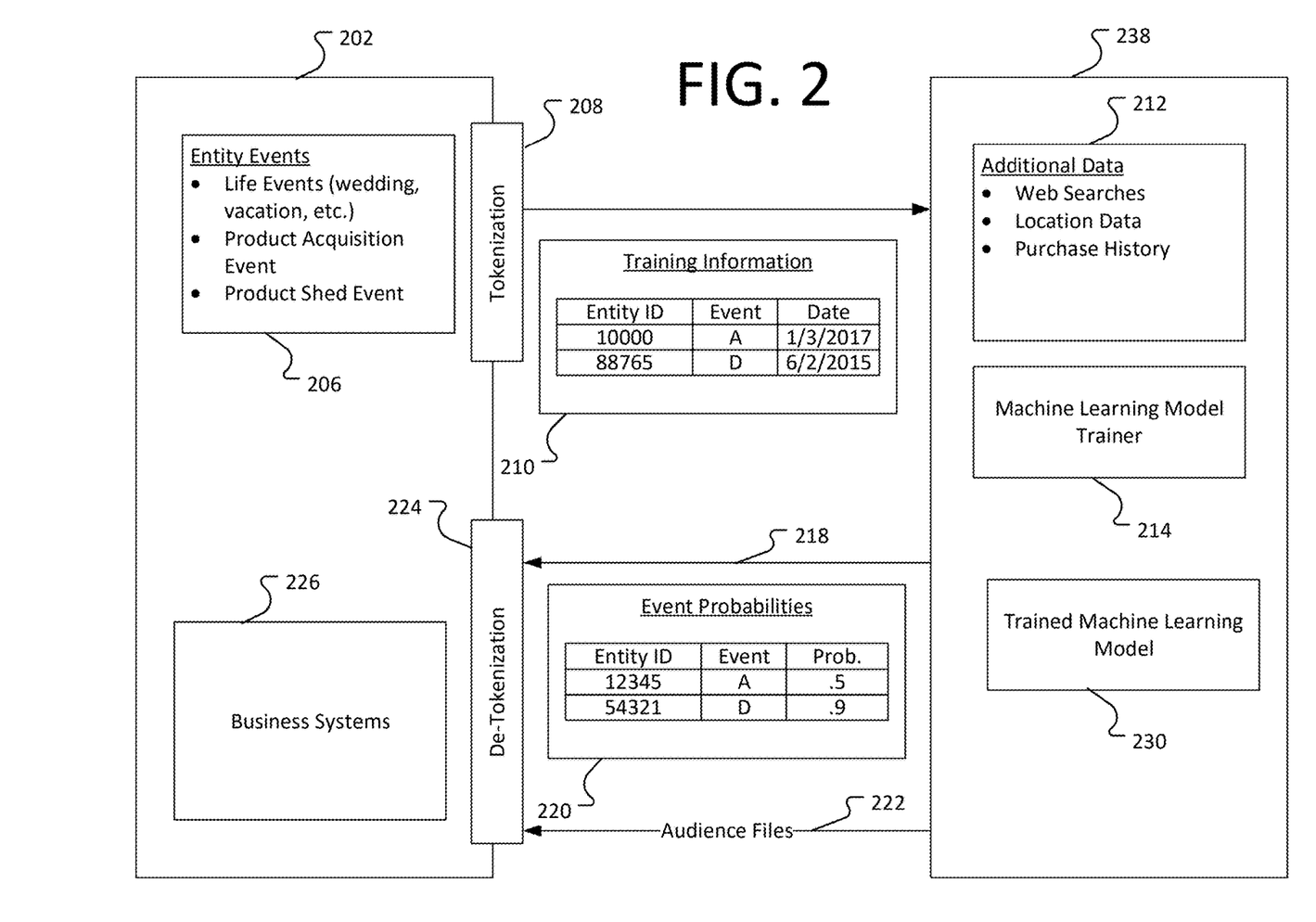
FIG. 2 illustrates an example of using tokens to identify entities likely to experience an event.

FIG. 2 illustrates an example of using tokens to identify entities likely to experience an event. A computer 202 at an organization (for example, the organization 102 of FIG. 1) may maintain a list of different events for in which the organization is interested. The events may be, for example, major life events such as a marriage, divorce, birth of a child, move, job change, etc. The events may be minor life events such as a large purchase like an automobile, vacation, etc. The events may also be events such as the purchase of a product or service, cancelation of a product or service, the opening or closing of a financial account, etc.

The computer 202 may store and maintain a data store that identifies tokens associated with each of these events. A token may be, as described above, a number, string, hash, etc. that can be used by the organization to identify an event, but, in itself, does not contain information sufficient for a third party to identify an event. In some implementations, the token may be an event id that is encrypted using a private key associated with the computer 202 or organization. In some implementations, the event token may be a surrogate key associated with the event in a data store. The event token may be a hash of the surrogate key or description of the event id. The event token may be a randomly generated number or string.

The computer 202 may generate a list of entities who have experienced or otherwise been associated with the events. The list may also identify the date at which the event occurred or that the entity became associated with the event. For example, if a customer "John Smith" has a shared id of 14521, was married on Mar. 1, 2000, and the married event was identified using the token "A24", then the list may include an entry: "14521, A24, 03/01/2000."

The computer 202 may send the list to a machine learning system 238. In some implementations, a tokenization process 208 may tokenize the list or elements on the list as the items are added or just before the list is sent to the machine learning system 238.

While the data sent from the computer 202 to the machine learning system 238 is described as a list, it should be understood that other data structures may also be used. For example, the data may be provided using a hierarchical data structure (such as an XML file). For example, the information may be organized in a hierarchy that places the tokenized event as a top node and the shared identified and date as subnodes.

The machine learning system 238 may use as input additional data 212 that may be associated with various entities, including at least some of the entities included on the list. The additional data may include, for example, different behavioral, environmental, or relationship data. Machine learning system 238 trains one or more trained machine learning models 230 using a machine learning trainer 214 using the list of identifiers, events, and dates 210 provided by the computer and the additional data 212 collected or accessed by the machine learning system 228. In some implementations, the additional data may include behavior data that reflects the activities of one or more users on computer system.

Once the machine learning models 230 are trained, the trained machine learning models 230 can be used identify other entities who are likely to experience the same event within a predetermined timeframe (for example, 3 months, 6 months, a year). Each entity and event may be associated with a probability that the entity will experience the event 218.

In some implementations, the trained machine learning models 230 may provide probabilities that an event may occur at each of several different timeframes. For example, the trained machine learning models may determine that customer 12345 is 50% likely to experience the event within 3 months and 85% likely to experience the event within 6 months.

In some implementations, the machine learning system 238 may provide a list of entities that may not have been previously known (or entities who have not be identified by the computer to the machine learning system). The list of entities may be provided to the computer 202 by the machine learning system as an "audience file" 222. In general, an audience file is a list of entities that are not individually identifiable by the computer system.

Once the information provided by the machine learning system 238 is detokenized 224, the information can be used by the business systems 226 for various purposes, including, but not limited to, marketing, fraud detection, personalization, discounts, and customer retention.

Figure 3:
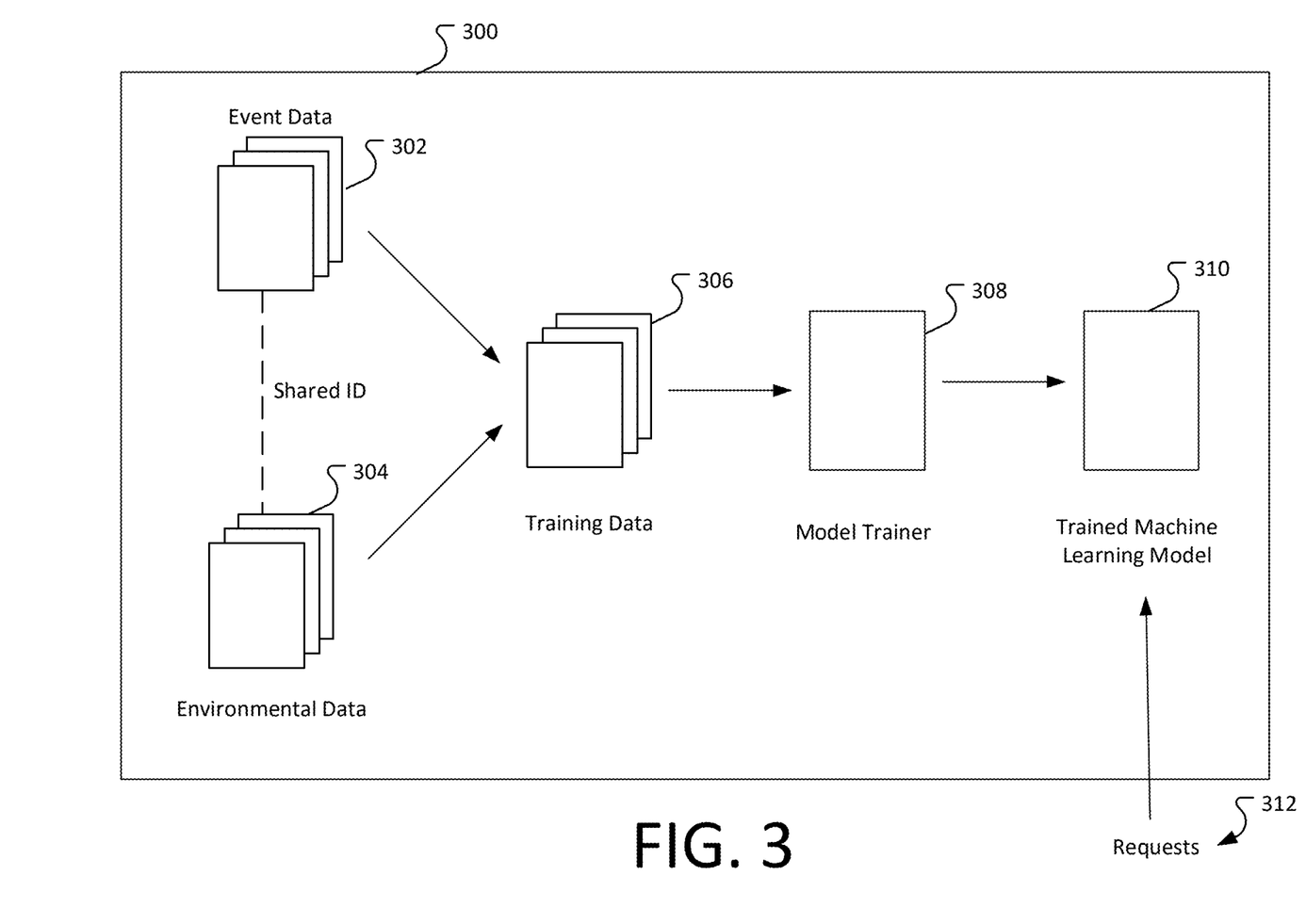
FIG. 3 depicts an example of training a machine learning system.

FIG. 3 depicts an example of training a machine learning model. The system 300 combines event data 302 and environmental data 304 using a shared ID to create training data 306 In some implementations, the environmental data 304 provides representative input data for the training data 306 and the event data 302 provides representative target label data for the training data 306. The training data 306 may include any suitable number of sets of training data. Each training example in the training data 306 may include event data combined with environmental data for a particular entity. The environment data may include information about the online activities of an entity, for example, web searches, browsing history, posts on social networks, endorsement of particular information posted on the web (for example, "likes" on "FACEBOOK" posts).

In some implementations, the event data 302 may include a date of the event for an entity. The environmental data 304 may include known actions and activities taken by the entity for a predetermined period of time before the date of the event (such as, for example, three months, six months, one year).

To train a trained machine learning model 310 (e.g., implemented as a neural network), the system 300 includes a model trainer 308 that employs the training data 306 for training operations. In some implementations, the trainer 306 may calculate numerical representations of training data (e.g., in vector form) for machine training. In some implementations, the machine learning techniques include feature extraction to build different neurons within a neural network. One or more features may translate to one more actions taken by the entities. For example, a particular feature may correspond to a particular web search, such that the strength of a feature present leads to a particular metric being determined for the corresponding events.

Once trained, the trained machine learning model 310 is capable of receiving and processing requests 312. For example, given a set of recent actions (e.g., environmental data) for an entity, the trained machine learning model 310 is able to predict a probability that a particular event will occur within a predetermined timeframe.

In some implementations, the trained machine learning model 310 can filter entities for whom the probability of experiencing an event is below a threshold (for example, less than 50%). In some implementations, the threshold may be provided along with the training data, for example, for some events the threshold probability may be higher and for other events the threshold probability may be lower.

Figure 4:
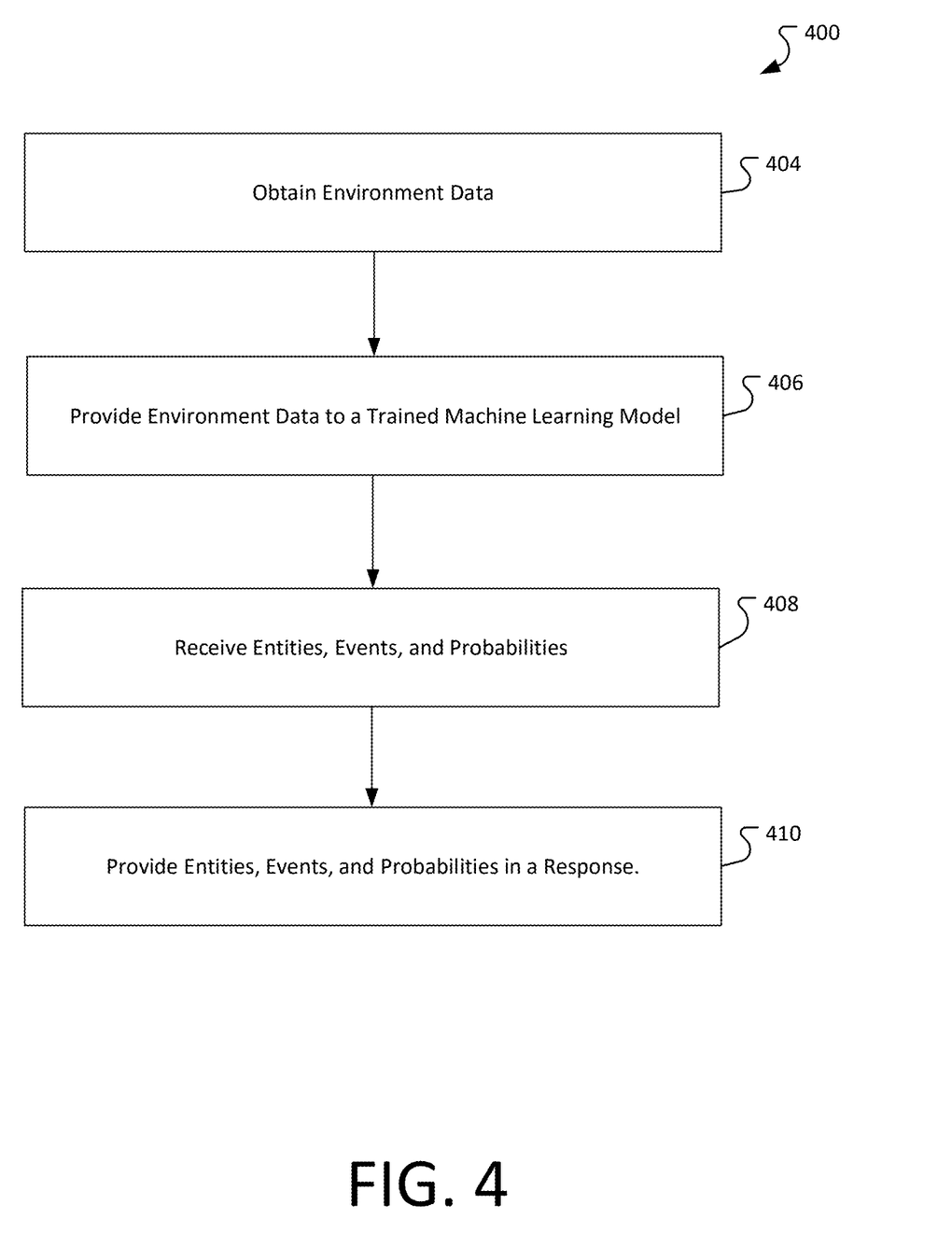
FIG. 4 is a flow chart of an example process for handling requests.

FIG. 4 is a flow chart of an example process for handling requests. The process can be performed by a machine learning system, for example, the trained machine learning model 230 of FIG. 2.

The process 400 may receive a request, the request can include one or more shared identifiers for entities. The request may also identify a predefined group of entities, for example, the requester may maintain a list of entities on a machine learning system. The request may also be for an evaluation of the entities on an ongoing, recurring basis, for example every hour.

The process 400 obtains 404 environment data for each of the one or more shared identifiers. The process 400 can gather the environmental data for the identified entities. For example, the process 400 can collect information about the online activities of the identified entities over the past 3 to 6 months.

The process 400 provides 406 the environment data to the trained machine learning model. Using the environment data as an input, for each entity, the trained machine learning model identifies event tokens and evaluates the probabilities associated with each event token.

The process 400 receives 408 a list of entities, events, and probabilities for the events from the trained machine learning model. In some implementations, the trained machine learning system may provide different probabilities for different timeframes.

The process provides 410 the list of entities, events, and probabilities as a response to the request.

Figure 5:
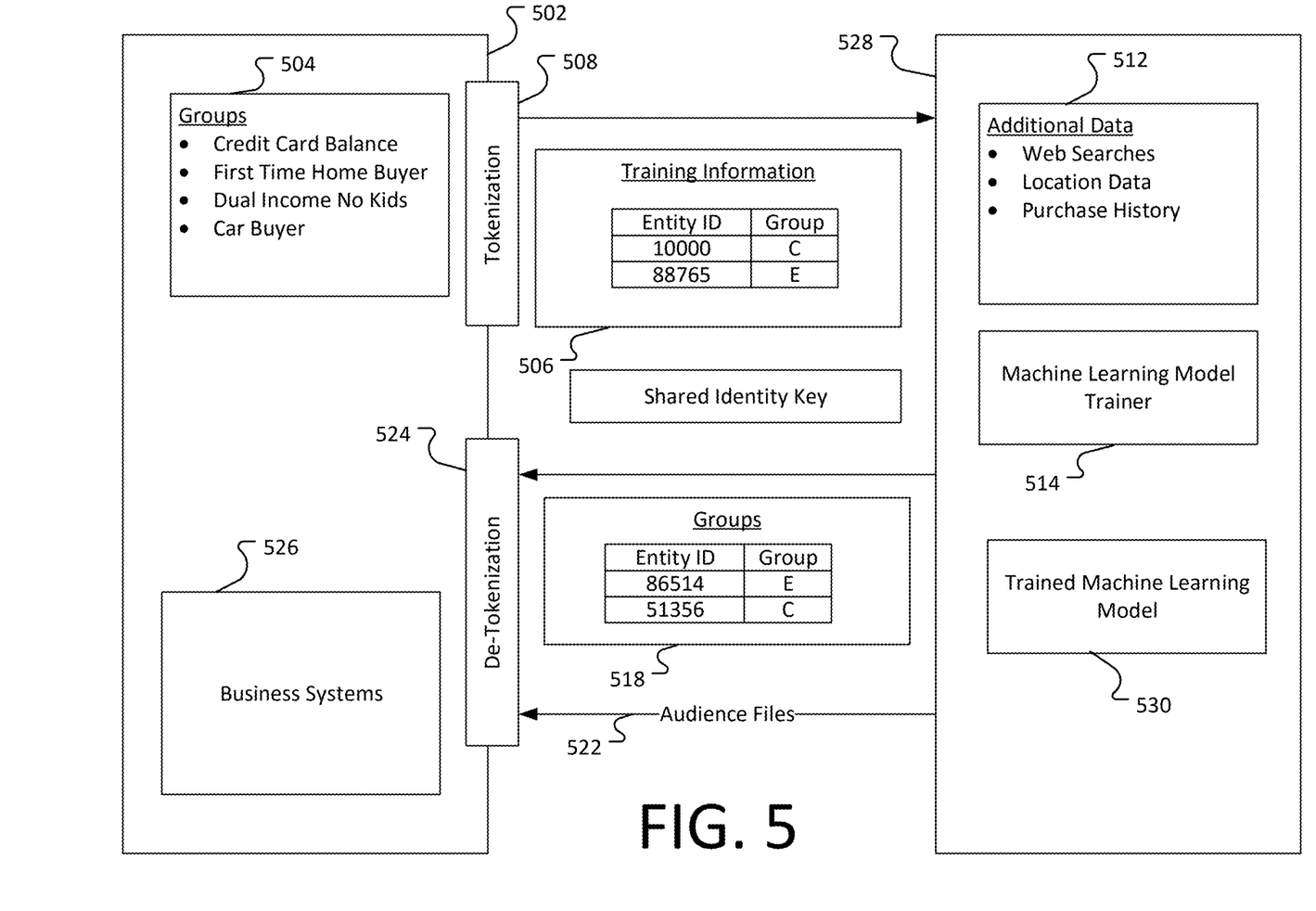
FIG. 5 illustrates an example of using tokens to identify entities who are members of a group.

FIG. 5 illustrates an example of using tokens to identify entities who are members of a group. In addition to using tokens to search for entities that are likely to experience an event, tokens can be used to search for entities who match certain group profiles 504. A computer 502 at an organization (for example, the organization 102 of FIG. 1) has identified particular entities as belonging to a particular group. The groups may be, for example, millennials who have a credit card balance, first time home buyers, couples with dual income and no children, active car buyers, etc.

The computer 502 may store and maintain a data store that identifies tokens associated with each of these groups. A token may be a number, string, hash, etc. that can be used by the organization to identify a group, but, in itself, does not contain information sufficient for a third party to identify the group. In some implementations, the token may be a group id that is encrypted using a private key associated with the computer 502 or organization. In some implementations, the group id may be a surrogate key associated with the group in a data store. In some implementations, the group id may be a hash of the surrogate key or description of the event. In some implementations, the group may be a randomly generated number or string.

The computer 502 may generate a list 506 of entities who are members of the group. For example, if a customer "Jane Smith" has a shared id of 10000, and is a first time home buyer, the list may include a record: "100000, C."

The computer 502 may send the list to a machine learning system 528. In some implementations, a tokenization process 508 may tokenize the list or elements on the list as the items are added or just before the list is sent to the machine learning system 528.

The machine learning system 528 may use as input additional data 512 that may be associated with various entities, including at least some of the entities included on the list. The additional data can include, for example, different behavioral, environmental, or relationship data. Machine learning system 528 trains one or more trained machine learning models 530 using a machine learning trainer 514 using the list of identifiers and tokenized groups 510 provided by the computer and the additional data 512 collected or accessed by the machine learning system 528.

Once the machine learning model 530 is trained, the trained machine learning model 530 can be used identify other entities who are members of the groups 518. In some implementations, identifying that an entity is a member of a group can include determining a measure of similarity that the entity is a member of the group and comparing the measure to a threshold. If the measure of similarity meets the threshold requirement, then the trained machine learning model assigns the entity to the group.

In some implementations, the machine learning system may provide a list of entities that may not have been previously known (or entities who have not been specifically identified by the computer). The list of entities may be provided to the computer 502 by the machine learning system as an "audience file" 522. In general, an audience file is a list of entities that are not individually identifiable by the computer system.

Once the information provided by the machine learning system 528 is detokenized 524, the information can be used by the business systems 526 for various purposes, including, but not limited to, marketing, fraud detection, personalization, discounts, and customer retention.

Figure 6:
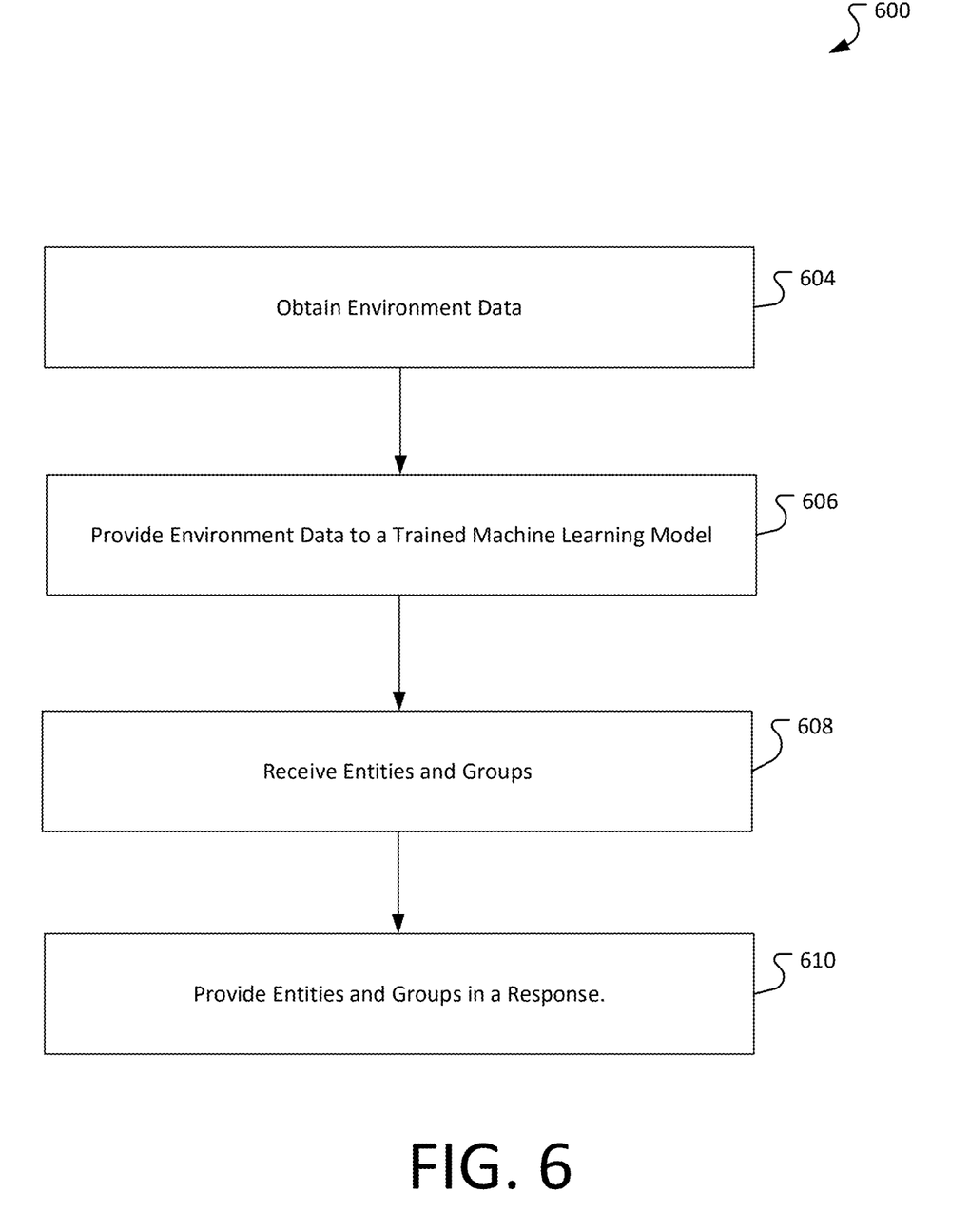
FIG. 6 is a flow chart of an example process for handling requests.

FIG. 6 is a flow chart of an example process for handling requests. A trained machine learning model, for example, the machine learning system 530 of FIG. 5, can perform the process.

The process 600 may receive a request, the request can include one or more shared identifiers for entities. The request may also identify a predefined group of entities, for example, the requester may maintain a list of entities on a machine learning system. The request may also be for an evaluation of the entities on an ongoing, recurring basis, for example every hour.

The process 600 obtains 604 environment data for each of the one or more shared identifiers. The process 600 can gather the environmental data for the identified entities.

The process 600 provides 606 the environment data to the trained machine learning model. Using the environment data as an input, for each entity, the trained machine learning model identifies group tokens and measures of similarity associated with each group token.

The process 600 receives 608 a list of entities and groups from the trained machine learning model. In some implementations, the process 600 may filter the group tokens based on the measure of similarity.

The process provides 610 the list of entities and groups in response to the request.

Figure 7:
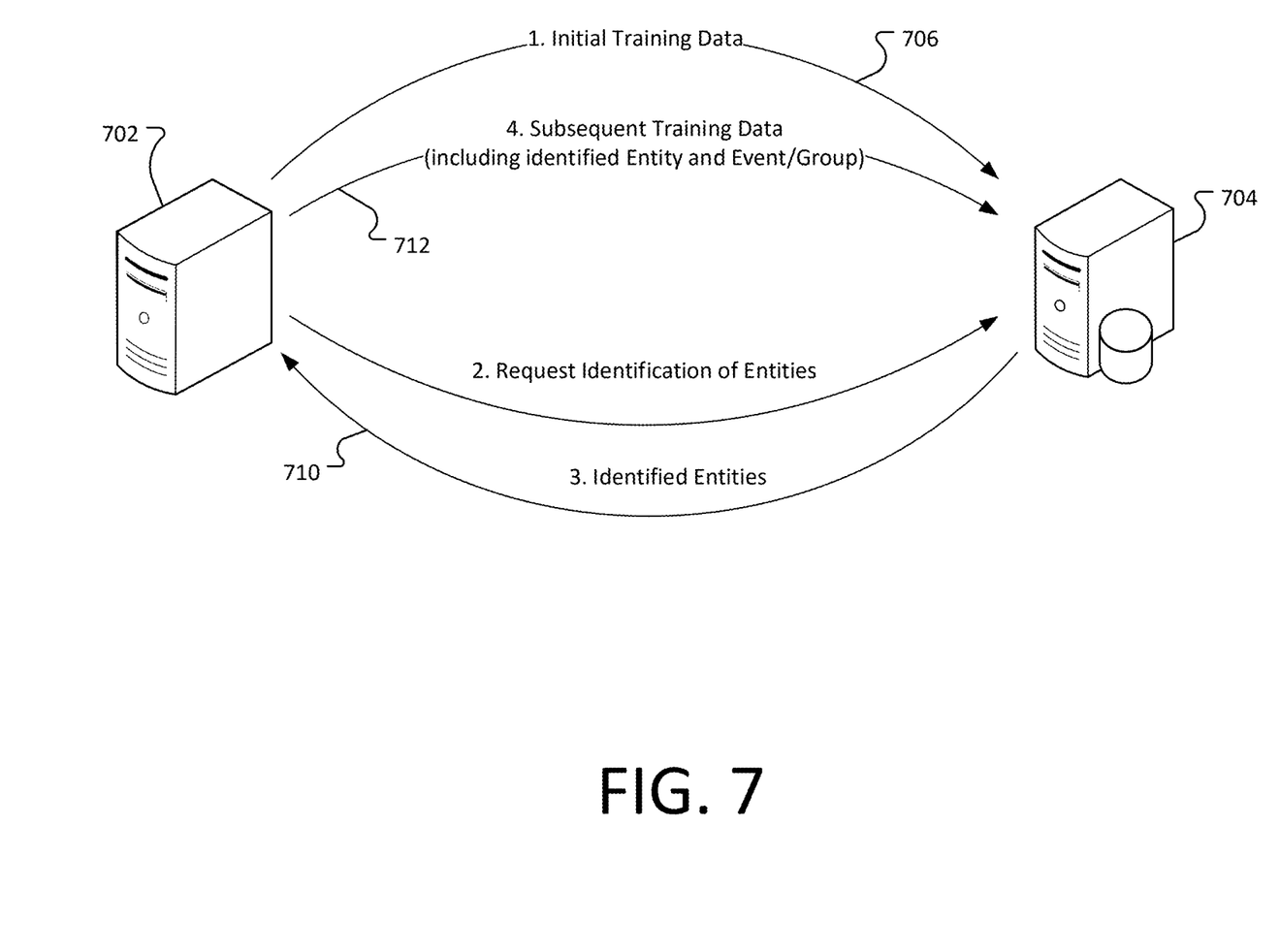
FIG. 7 illustrates an example of improving the trained machine learning system using feedback.

FIG. 7 illustrates an example of improving the trained machine learning system using feedback. A computer 702 provides 706 initial training data to a machine learning system 704. The machine learning system 704 may train a machine learning model as described above. At a subsequent time, the computer 702 may request 708 the identification of entities who are either likely to experience an event or who are members of a group, as described above. The machine learning system 704 identifies the entity 710 and provides 710 the identified entities to the computer system.

As described above, because the machine learning model does not have access to the underlying meaning assigned to a token, the machine learning system 704 does not have knowledge of what the events are or what the profile groups are, and as such, does not have a way to measure the success or failure of the machine learning system. However, the organization that controls the computer system 702 does have knowledge about the underlying meaning of the token, and therefore, can evaluate the success or failure of the machine learning system 704.

To provide the machine learning system 704 with feedback, the computer 702 can provide information to the machine learning system 704 about successful predictions. For example, if the machine learning system 704 determines that an event is likely to occur for an entity and the event does occur, the computer 702 can provide 712 that information in a subsequent training set. Similarly, if the machine learning system 712 predicts that an event is likely to occur for an entity and the event does not occur, the failure of the event to occur may be provided as a negative example.

Group information feedback can be provided in a similar manner. For example, if the machine learning system 704 identifies an entity as a member of a group, and the organization verifies that the entity is a member of that group, then the entity can be provided as a training example in the next training set. Similarly, if the entity is identified to not be a member of the group then the entity can be provided as a negative example in a subsequent training set.

Figure 8:
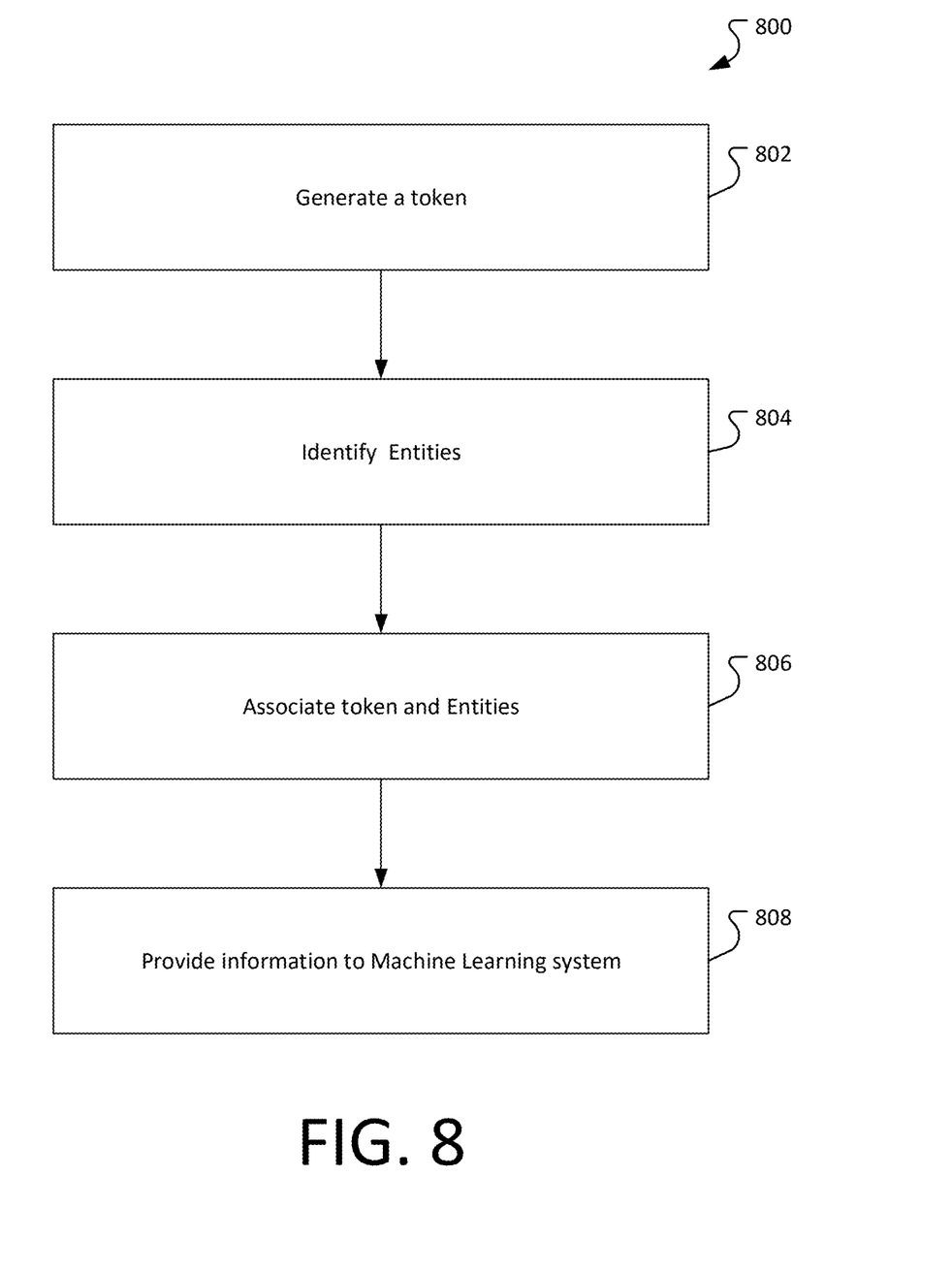
FIG. 8 is a flowchart of an example process for sharing private information with a machine learning system.

FIG. 8 is a flowchart of an example process for sharing private information with a machine learning system.

The process 800 generates 802 a token representative of private data. The token may be a string or other value that the process 802 identifies with an event or a group but does not, in itself, convey information about the event or group.

The process 800 identifies 804 at least one entity associated with the private data. The entity may be known to have experienced the event (for example, got married, had a child, etc.) or may be known to be a member of the group (for example, people who maintain a credit card balance).

The process 800 associates 806 the token with at least one entity.

The process 800 provides information identifying at least one entity and the token to a machine learning system. The machine learning system uses the information provided, along with other data, to train one or more machine learning models.

Figure 9:
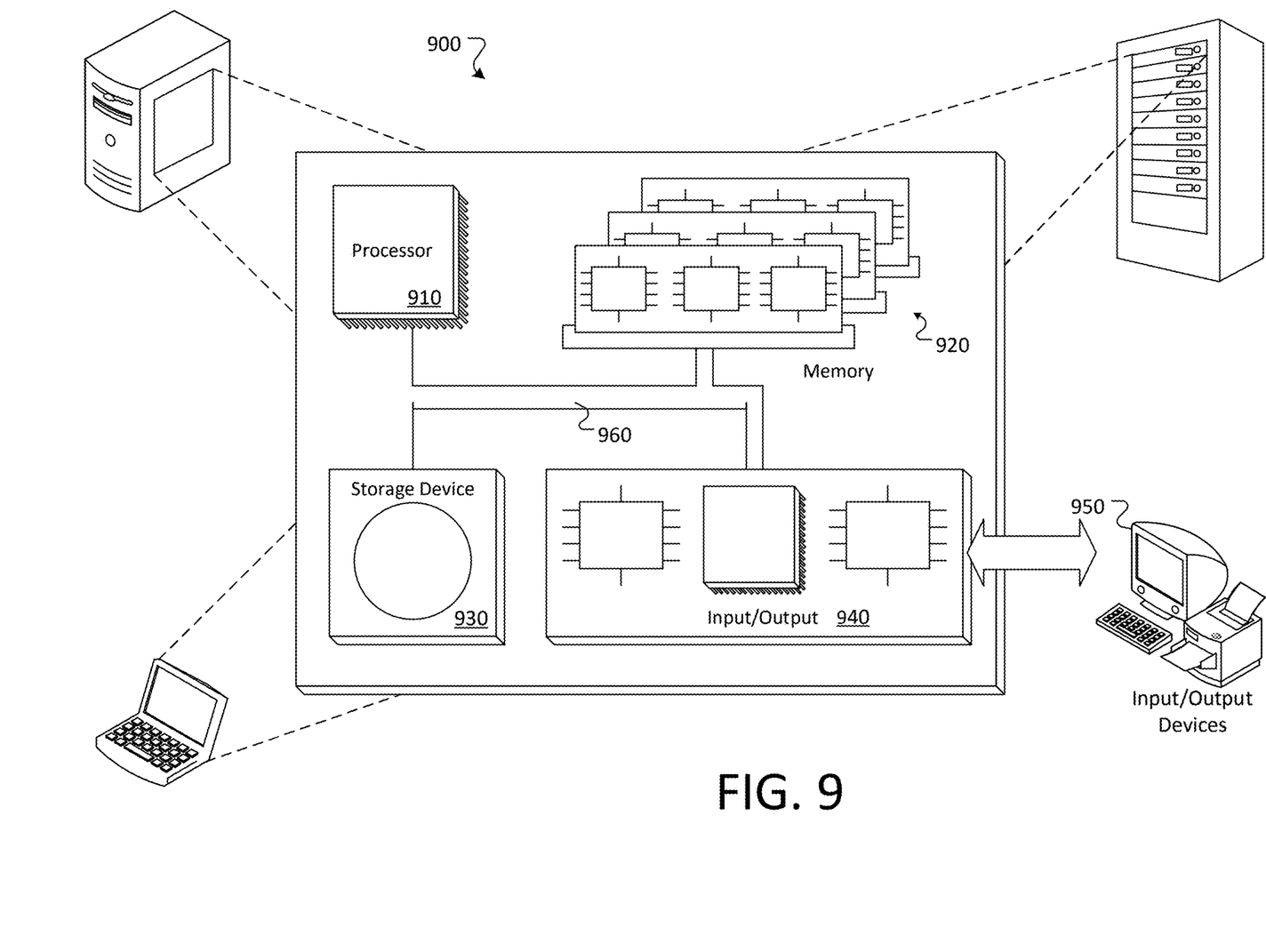
FIG. 9 depicts an example computing system, according to implementations of the present disclosure.

FIG. 9 depicts an example computing system, according to implementations of the present disclosure. The system 900 may be used for any of the operations described with respect to the various implementations discussed herein. The system 900 may include one or more processors 910, a memory 920, one or more storage devices 930, and one or more input/output (I/O) devices 950 controllable through one or more I/O interfaces 940. The various components 910, 920, 930, 940, or 950 may be interconnected through at least one system bus 960, which may enable the transfer of data between the various modules and components of the system 900.

The processor(s) 910 may be configured to process instructions for execution within the system 900. The processor(s) 910 may include single-threaded processor(s), multi-threaded processor(s), or both. The processor(s) 910 may be configured to process instructions stored in the memory 920 or on the storage device(s) 930. The processor(s) 910 may include hardware-based processor(s) each including one or more cores. The processor(s) 910 may include general purpose processor(s), special purpose processor(s), or both.

The memory 920 may store information within the system 900. In some implementations, the memory 920 includes one or more computer-readable media. The memory 920 may include any number of volatile memory units, any number of non-volatile memory units, or both volatile and non-volatile memory units. The memory 920 may include read-only memory, random access memory, or both. In some examples, the memory 920 may be employed as active or physical memory by one or more executing software modules.

The storage device(s) 930 may be configured to provide (e.g., persistent) mass storage for the system 900. In some implementations, the storage device(s) 930 may include one or more computer-readable media. For example, the storage device(s) 930 may include a floppy disk device, a hard disk device, an optical disk device, or a tape device. The storage device(s) 930 may include read-only memory, random access memory, or both. The storage device(s) 930 may include one or more of an internal hard drive, an external hard drive, or a removable drive.

One or both of the memory 920 or the storage device(s) 930 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 900. In some implementations, the CRSM may include a data store that provides storage of computer-readable instructions or other information in a non-transitory format. The CRSM may be incorporated into the system 900 or may be external with respect to the system 900. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 910 and the memory 920 may be supplemented by, or incorporated into, one or more application-specific integrated circuits (ASICs).

The system 900 may include one or more I/O devices 950. The I/O device(s) 950 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 950 may also include one or more output devices such as a display, LED(s), an audio output device (e.g., a speaker), a printer, a haptic output device, and so forth. The I/O device(s) 950 may be physically incorporated in one or more computing devices of the system 900, or may be external with respect to one or more computing devices of the system 900.

The system 900 may include one or more I/O interfaces 940 to enable components or modules of the system 900 to control, interface with, or otherwise communicate with the I/O device(s) 950. The I/O interface(s) 940 may enable information to be transferred in or out of the system 900, or between components of the system 900, through serial communication, parallel communication, or other types of communication. For example, the I/O interface(s) 940 may comply with a version of the RS-232 standard for serial ports, or with a version of the IEEE 1284 standard for parallel ports. As another example, the I/O interface(s) 940 may be configured to provide a connection over Universal Serial Bus (USB) or Ethernet. In some examples, the I/O interface(s) 940 may be configured to provide a serial connection that is compliant with a version of the IEEE 1394 standard.

The I/O interface(s) 940 may also include one or more network interfaces that enable communications between computing devices in the system 900, or between the system 900 and other network-connected computing systems. The network interface(s) may include one or more network interface controllers (NICs) or other types of transceiver devices configured to send and receive communications over one or more networks using any network protocol.

Computing devices of the system 900 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 900 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method performed by at least one processor, the method comprising:
   generating, by at least one processor, for each of a plurality of events, a respective token that represents the event, wherein the respective token representing the event is encrypted using a private key associated with an organization and allows the organization to identify the event but does not allow a third party to identify the event;
   for each event of the plurality of events:
      identifying, by at least one processor, at least one entity associated with the event;
      associating the respective token encrypted by the private key of the organization and representing the event with the at least one entity;
      communicating, by at least one processor, the respective token and the at least one entity as label data for training of a machine learning system; and
      associating the respective token encrypted by the private key and representing the event and the at least one entity with environmental data of the at least one entity to generate feature data for training of the machine learning system, wherein the environmental data indicates online activities taken by the at least one entity for a predetermined period of time before a date of the event;
   combining the label data and the feature data to generate training data for training the machine learning system;
   training the machine learning system on the training data comprising both (i) the label data and (ii) the feature data generated from the environmental data indicating online activities taken by the at least one entity; and
   providing other environmental data indicating one or more other recent online activities of another entity as input to the trained machine learning system;
   processing, using the trained machine learning system, the other environmental data indicating the one or more other recent online activities of another entity to generate an output that indicates that a particular event will likely occur within a predetermined time frame;
   determining whether the particular event occurred based on subsequent observation data associated with the other entity;
   providing feedback data to the machine learning system based on the determination, the feedback data comprising a positive example when the particular event occurred and a negative example when the particular event did not occur; and
   retraining the machine learning system on the training data and the feedback data.

2. The computer-implemented method of claim 1, wherein the at least one entity has an identifier shared with the machine learning system.

3. The computer-implemented method of claim 1, wherein using the trained machine learning system to make one or more inferences on entities for the respective tokens comprises:
   for each of one or more events in the plurality of events,
      identifying, using the trained machine learning system, a set of new entities that each having a probability of experiencing the event within a predetermined time frame, wherein each probability is greater than zero, and
      filtering, by at least one processor, from the set of new entities, entities for which the probability of experiencing the event is below a threshold to obtain an updated set of new entities.

4. The computer-implemented method of claim 3, further comprising: providing, over a computer network, information on the updated set of new entities to the organization.

5. The computer-implemented method of claim 1, wherein the plurality of events comprises one or more life events comprising at least one of a marriage, a divorce, a childbirth, or a job change.

6. The computer-implemented method of claim 1, wherein the plurality of events comprises one or more major purchases comprising at least one of a purchase of a house, a purchase of a car, or a purchase of a vacation package.

7. One or more non-transitory computer storage media storing instructions which, when executed by at least one processor, cause the at least one processor to perform operations comprising:
   generating, for each of a plurality of events, a respective token that represents the event, wherein the respective token representing the event is encrypted using a private key associated with an organization and allows the organization to identify the event but does not allow a third party to identify the event;
   for each event of the plurality of events:
      identifying at least one entity associated with the event;
      associating the respective token encrypted by the private key of the organization and representing the event with the at least one entity;
      communicating the respective token and associated entity as label data for training of a machine learning system; and
      associating the respective token encrypted by the private key and representing the event and the at least one entity with environmental data of the at least one entity to generate feature data for training of the machine learning system, wherein the environmental data indicates online activities taken by the at least one entity for a predetermined period of time before a date of the event;
   combining the label data and the feature data to generate training data for training the machine learning system;
   training the machine learning system on the training data comprising both (i) the label data and ii the feature data generated from the environmental data indicating online activities taken by the at least one entity; and
   providing other environmental data indicating one or more other recent online activities of another entity as input to the trained machine learning system;
   processing, using the trained machine learning system, the other environmental data indicating the one or more other recent online activities of another entity to generate an output that indicates that a particular event will likely occur within a predetermined time frame;

determining whether the particular event occurred based on subsequent observation data associated with the other entity;

providing feedback data to the machine learning system based on the determination, the feedback data comprising a positive example when the particular event occurred and a negative example when the particular event did not occur; and retraining the machine learning system on the training data and the feedback data.

8. The one or more non-transitory computer storage media of claim 7, wherein the at least one entity has an identifier shared with the machine learning system.

9. The one or more non-transitory computer storage media of claim 7, wherein the operations for using the trained machine learning system to make one or more inferences on entities for the respective tokens comprise:

for each of one or more events in the plurality of events, identifying, using the trained machine learning system, a set of new entities that each having a probability of experiencing the event within a predetermined time frame, wherein each probability is greater than zero, and filtering, by at least one processor, from the set of new entities, entities for which the probability of experiencing the event is below a threshold to obtain an updated set of new entities.

10. The one or more non-transitory computer storage media of claim 9, wherein the operations further comprise: providing, over a computer network, information on the updated set of new entities to the organization.

11. The one or more non-transitory computer storage media of claim 7, wherein the plurality of events comprises one or more life events comprising at least one of a marriage, a divorce, a childbirth, or a job change.

12. The one or more non-transitory computer storage media of claim 7, wherein the plurality of events comprises one or more major purchases comprising at least one of a purchase of a house, a purchase of a car, or a purchase of a vacation package.

13. A system, comprising:

at least one processor; and a memory communicatively coupled to the at least one processor, the memory storing instructions which, when executed by the at least one processor, cause the at least one processor to perform operations comprising:

generating, by at least one processor, for each of a plurality of events, a respective token that represents the event, wherein the respective token representing the event is encrypted using a private key associated with an organization and allows the organization to identify the event but does not allow a third party to identify the event;

for each event of the plurality of events:

identifying, by at least one processor, at least one entity associated with the event;

associating the respective token encrypted by the private key of the organization and representing the event with the at least one entity;

communicating, by at least one processor, the respective token and the at least one entity as label data for training of a machine learning system; and associating the respective token encrypted by the private key and representing the event and the at least one entity with environmental data of the at least one entity to generate feature data for training of the machine learning system, wherein the environmental data indicates online activities taken by the at least one entity for a predetermined period of time before a date of the event;

combining the label data and the feature data to generate training data for training the machine learning system;

training the machine learning system on the training data comprising both (i) the label data and ii the feature data generated from the environmental data indicating online activities taken by the at least one entity; and providing other environmental data indicating one or more other recent online activities of another entity as input to the trained machine learning system;

processing, using the trained machine learning system, the other environmental data indicating the one or more other recent online activities of another entity to generate an output that indicates that a particular event will likely occur within a predetermined time frame;

determining whether the particular event occurred based on subsequent observation data associated with the other entity;

providing feedback data to the machine learning system based on the determination, the feedback data comprising a positive example when the particular event occurred and a negative example when the particular event did not occur; and retraining the machine learning system on the training data and the feedback data.

14. The system of claim 13, wherein the at least one entity has an identifier shared with the machine learning system.

15. The system of claim 13, wherein the operations for using the trained machine learning system to make one or more inferences on entities for the respective tokens comprise:

for each of one or more events in the plurality of events, identifying, using the trained machine learning system, a set of new entities that each having a probability of experiencing the event within a predetermined time frame, wherein each probability is greater than zero, and filtering, by at least one processor, from the set of new entities, entities for which the probability of experiencing the event is below a threshold to obtain an updated set of new entities.

16. The system of claim 15, wherein the operations further comprise: providing, over a computer network, information on the updated set of new entities to the organization.

17. The system of claim 13, wherein the plurality of events comprises one or more life events comprising at least one of a marriage, a divorce, a childbirth, or a job change.

18. The system of claim 13, wherein the plurality of events comprises one or more major purchases comprising at least one of a purchase of a house, a purchase of a car, or a purchase of a vacation package.

* * * * *